Nov. 21, 1944. W. E. WINE 2,363,105
DEMOUNTABLE TRACTION UNIT
Filed Aug. 21, 1942 2 Sheets-Sheet 2
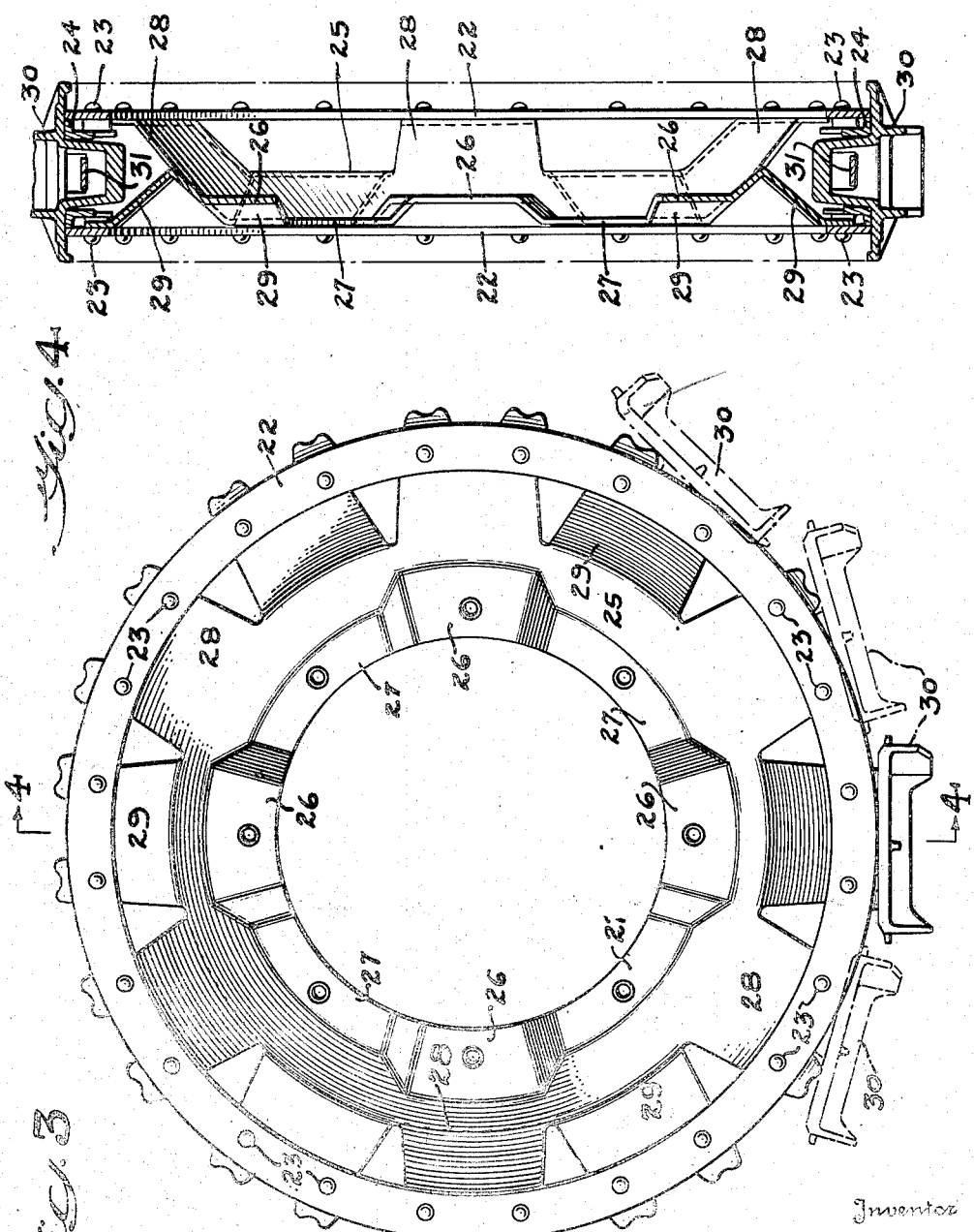

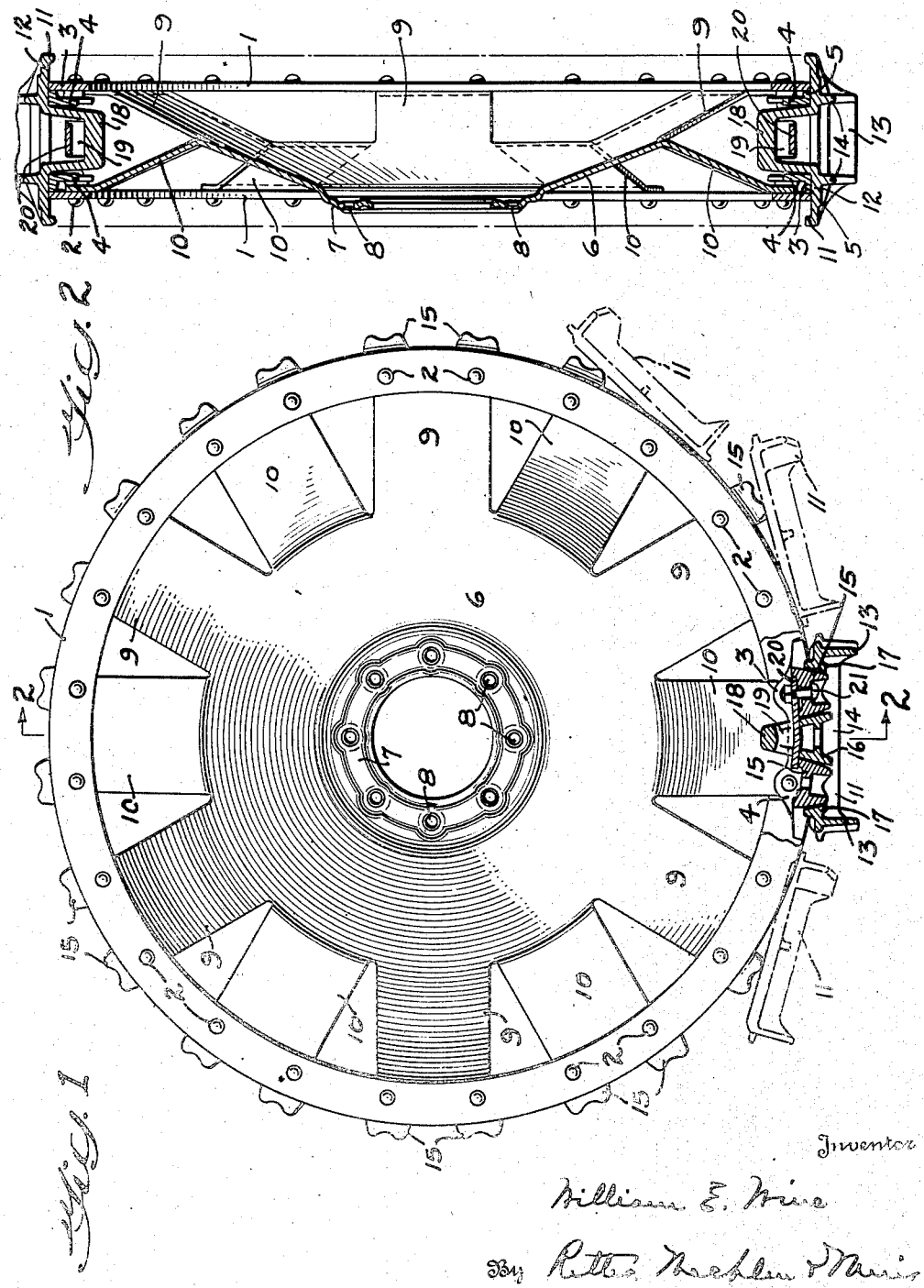

Patented Nov. 21, 1944

2,363,105

UNITED STATES PATENT OFFICE 2,363,105

DEMOUNTABLE TRACTION UNIT

William E. Wine, Toledo, Ohio

Application August 21, 1942, Serial No. 455,634

4 Claims. (Cl. 301—63)

My invention relates to tractor wheels and more particularly to a demountable annular traction unit for such wheels.

The principal object of the invention is to provide a demountable annular traction unit of all metal construction which employs a minimum amount of metal and number of parts and possesses the requisite strength and durability.

A primary feature of the invention consists in providing a traction unit with a pair of laterally spaced rims and with a substantially conical plate-like annulus which is notched adjacent its outer edge to provide a plurality of diverging arms rigidly secured to the rims.

Another feature of the invention consists in providing the central portion of the conically shaped annulus of the traction unit with a flange having laterally offset portions adapted for selective attachment to the tractor wheel so that the distance between the tread portions of the wheels on the same axle may be varied.

Other and more specific features of the invention, residing in advantageous forms, combinations and relations of parts, will hereinafter appear and be pointed out in the claims.

In the drawings,

Figure 1 is a side elevational view of a traction unit embodying one form of the invention, most of the shoes with which the unit is provided being omitted for clarity.

Figure 2 is a transverse sectional view of the traction unit taken on line 2—2 of Figure 1, all but the shoes at the top and the bottom of the unit being omitted.

Figure 3 is a side elevational view of a tractor unit embodying another form of the invention, most of the shoes with which the unit is provided being omitted.

Figure 4 is a vertical transverse sectional view of the traction unit illustrated in Figure 3, the view being taken on line 3—3 of that figure and omitting all but the shoes at the top and bottom of the unit.

Referring more particularly to the drawings and to the form of the invention illustrated in Figures 1 and 2 thereof, I indicates a pair of laterally spaced substantially parallel rim elements. Interposed between the rim elements at suitable intervals and rigidly secured thereto by any convenient means, such as rivets 2, are a plurality of spacers 3. Each of the spacers has upright side walls 4 which are arranged in overlapping relation with the inner faces of the rim elements and through which the rivets 2 extend. The side walls 4 of each of the spacers are connected by gear teeth 15 which are hereinafter described.

Disposed inwardly of the rims is a supporting member therefor which is in the form of a substantially conical plate-like annulus 6. The central portion of the annulus is provided with a flange 7 which is substantially perpendicular to the axis of the wheel and has a plurality of apertures 8 for receiving bolts or the like (not shown) with which the wheel support on a tractor axle is customarily provided for demountably securing the wheel in place.

The outer edge portion of the annulus is formed with a plurality of substantially V-shaped notches to provide a plurality of circumferentially spaced arms which are rigidly secured at their extremities to the rims 1 by the rivets 2. Some of the arms, designated 9 in the drawings, have the same inclination with respect to the axis of the wheel as the annulus and in effect constitute prolongations or continuations thereof, while the remaining arms, designated 10, are bent outwardly with respect to the surface of revolution defining the outer face of the annulus so as to diverge from arms 9. The two sets of arms thus incline in opposite directions with respect to the axis of the wheel, being preferably arranged at equal angles thereto. Moreover, the arms of one set preferably alternate with those of the other set and an equal number is secured to each rim.

To provide a track on which the traction unit may roll, a shoe 11 is movably associated with each spacer 3. Each shoe has a plate-like base portion 12 and downwardly extending transverse ground engaging flanges 13 which may be connected and suitably reinforced by longitudinally extending ribs 14.

Each shoe is loosely connected to its associated spacer so that, when it engages the ground, the traction unit or wheel moves relatively to it; that is to say, the shoe upon engaging the ground becomes stationary while the wheel continues to move. This may be accomplished by providing each spacer with transverse gear teeth 15 to form a gear segment and by providing each shoe with gear teeth to form a rack with which the teeth of the spacer are adapted to mesh. The pitch circle of the gear teeth on the spacer preferably has the same diameter as that of the outer edges of the rims 2 and the face portions as well as the flank portions of each of the teeth are adapted to cooperate with the teeth on the shoe.

Each shoe is formed with a central tooth 16 and end teeth 17, the profiles of each of these teeth being such as to work with the teeth on the spacers with a minimum of slipping or sliding. The central tooth 16 has an extension 18 provided with an opening 19 to receive a shoe retaining plate 20 which bridges the space between the teeth 15 on the spacer and is rigidly secured to one of the teeth by a bolt 21. The opening 19 in the extension of the central tooth on the shoe through which plate 20 passes is of sufficient size and shape to permit the shoe to angle sufficiently with respect to the rim that the base portion of the shoe may assume a position substantially parallel with the surface over which the wheel is to pass at the time the weight of the wheel and the load it carries is transmitted to the shoe.

The traction unit illustrated in Figures 3 and 4 of the drawings is adapted to form the peripheral portion of a tractor wheel and to be substituted for the demountable rubber tire with which tractors are now customarily equipped. The particular unit shown in Figures 3 and 4 is well adapted for use with tractor wheels having demountable tire securing bolts located approximately 10 inches from the center of the wheel and where the outside diameter of the tire is about 38 inches. It will, of course, be appreciated, however, that the dimensions of the unit may be changed as desired to accommodate it to an infinite number of different size wheels.

Like the unit in Figures 1 and 2, the unit illustrated in Figures 3 and 4 has a pair of laterally spaced substantially parallel rim elements 22 rigidly connected by rivets 23 to spacers 24, the latter being of the same construction as the spacers 3 in the form of the invention shown in Figures 1 and 2.

The supporting member for the rims consists of a plate-like annulus 25 of substantially conical shape. The central portion of the annulus is provided with a flange having laterally offset portions 26 and 27, respectively, which are substantially perpendicular to the wheel axis and are respectively adapted to be selectively attached to the tractor wheel. The offset portions 26 alternate with the offset portions 27 and the two sets of portions are spaced unequal distances from a plane located midway between and parallel with the rim elements so that, by reversing the unit and securing one or the other set of offset portions to the wheel, the distance between the tread portion of the wheels on the same axle may be varied.

The outer edge portion of the annulus is formed with a plurality of substantially V-shaped notches to provide a plurality of circumferentially spaced arms which are secured to the rim elements 22 by the rivets 23. As in the unit of Figures 1 and 2, some of the arms of the unit of Figures 3 and 4, designated 28 in the drawings, have the same inclination with respect to the axis of the wheel as the annulus, while the remaining arms, designated 29, are bent outwardly so as to diverge from arms 28. Arms 28 preferably alternate with arms 29 and they are advantageously disposed at equal angles to the axis of the wheel.

The shoes 30 with which the unit is provided is of the same construction as the shoes 11 in Figures 1 and 2 and they are connected to the spacers in the same manner by removable retaining plates 31.

From the foregoing, it will be appreciated that I have devised a simple and rugged traction unit. Various changes in details of construction may, of course, be made in the two forms of the invention illustrated and described without departing from the spirit and scope of the appended claims.

What I claim is:

1. A demountable tractor unit for a tractor wheel comprising a pair of laterally spaced rim elements, spacing members interposed between and rigidly secured to said rim elements, and a conically shaped plate-like annulus disposed inwardly of said rim elements adapted to be concentrically disposed with respect to the axis of the wheel, the outer portion of said annulus being integrally formed with a plurality of circumferentially spaced arms, some of said arms having the same inclination with respect to the axis of the wheel as said annulus and being secured to one of said rim elements, others of said arms being oppositely inclined with respect to said axis and being secured to the other of said rim elements.

2. A demountable traction unit for a tractor wheel comprising a pair of laterally spaced rim elements, spacing members interposed between and rigidly secured to said rim elements, and a conically shaped plate-like annulus disposed inwardly of said rim elements adapted to be concentrically disposed with respect to the axis of the wheel, the outer portion of said annulus being provided with a plurality of substantially V-shaped notches forming a plurality of circumferentially spaced arms, alternate ones of said arms being inclined in opposite directions with respect to the axis of the wheel and being secured to different ones of said rim elements, the arms secured to one of said rim elements being inclined in the same direction and at substantially the same angle to the axis of the wheel as said annulus.

3. A demountable traction unit for a tractor wheel comprising a pair of laterally spaced rim elements, and a substantially conical plate-like annulus disposed inwardly of said rim elements for supporting the latter, the central portion of said annulus being provided with a flange having two sets of laterally offset portions substantially perpendicular to the axis of the wheel adapted for selective attachment to the tractor wheel, one of said sets being spaced a greater distance from a plane located midway between and parallel with said rim elements than the other of said sets, the outer edge of said annulus being provided with a plurality of circumferentially spaced arms, alternate ones of said arms being inclined in opposite directions with respect to the axis of the wheel and the arms inclined in one direction being rigidly secured to one of said rim elements and the arms inclined in the other direction being rigidly secured to the other rim element.

4. A demountable traction unit for a tractor wheel comprising a pair of laterally spaced rim elements, and a substantially conical plate-like annulus disposed inwardly of said rim elements for supporting the latter, the central portion of said annulus being provided with a flange having two sets of laterally spaced portions adapted for selective attachment to the tractor wheel and respectively spaced unequal distances from a plane located midway between and parallel with said rim elements, the outer edge of said annulus being notched to provide a plurality of circumferentially spaced oppositely inclined arms, alternate ones of said arms being secured to different rim elements.

WILLIAM E. WINE.